Feb. 12, 1929.
F. O. SNOW, JR
1,702,223
TRACK CHAIN
Filed May 15, 1926
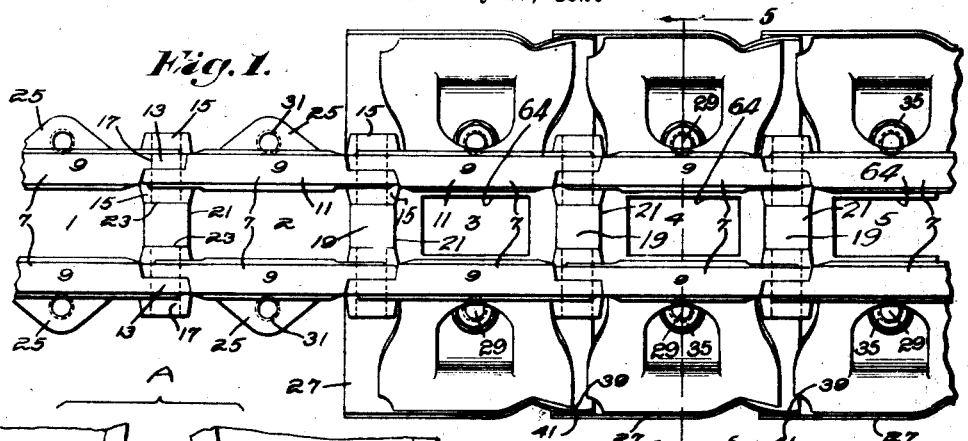
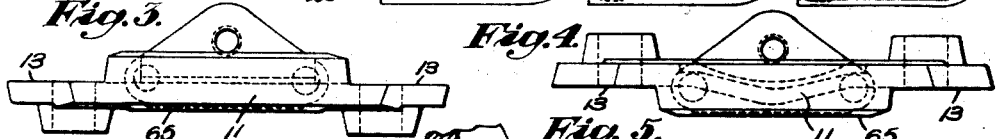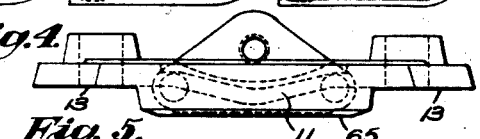
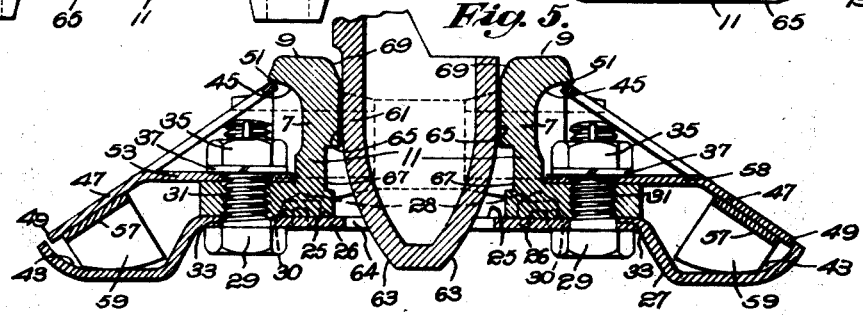
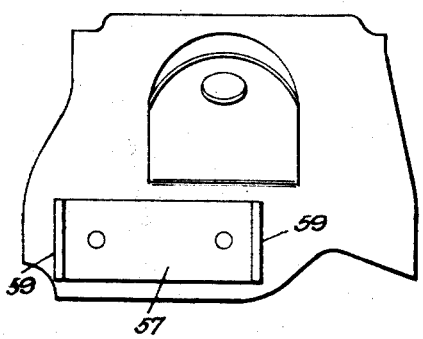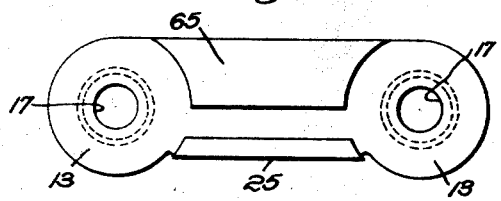
Inventor;
Frederick O. Snow Jr.,
by Emery, Booth, Janney & Varney
Attys.

Patented Feb. 12, 1929.

1,702,223

UNITED STATES PATENT OFFICE.

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE.

TRACK CHAIN.

Application filed May 15, 1926. Serial No. 109,289.

This invention aims to provide a strong, durable and efficient track chain for tracklaying tractors.

In the accompanying drawings, wherein is shown merely for illustrative purposes one embodiment of the invention, Fig. 1 is an inner plan view of a series of links of the chain with some of the tread plates removed and parts of certain of the links broken away;

Fig. 2 is a side elevation of that portion of the track shown in Fig. 1;

Fig. 3 is a detail plan view of one side member of a male link section;

Fig. 4 is a detail plan view of one side member of a female link section;

Fig. 5 is a transverse section through one of the links taken on the line 5—5 of Fig. 1 and illustrating in connection with said link a section of sprocket tooth;

Fig. 6 is an inside elevation of the side member shown in Fig. 4; and

Fig. 7 is a detail view of the under side stone deflector.

The tractor chain embodying this invention is of the type particularly adapted for use in connection with traction members having separated sprocket wheels over which the chain is arranged to travel with the lower run of the said chains, or that portion engaging the ground, supported between said sprockets by means such for example as a roller truck A shown in dotted lines, Fig. 2 thus making it desirable to provide tracks or rails upon the chain links for engaging the said guides or track rollers and providing a smooth, even rolling surface therefor.

The type of tractor to which such chains are adapted for use, namely the crawler or track-laying tractor, is so very well known that no further description or explanation is believed necessary.

In carrying out my invention I provide a chain comprising a series of links numbered in Figs. 1 and 2 as 1 to 5 respectively.

Each of the aforesaid links desirably includes a pair of side members 7, herein shown consisting of vertically arranged bars having flat broadened inner surfaces 9 constituting the tracks along which the rollers or supporting shoes are arranged to roll or slide. The rail portions of the several links of the series are desirably of uniform width and in alignment one with the other so as to form a continuous even track. The central portion 11 of each of said side members is webbed, as shown in dotted lines, Figs. 3 and 4, and in section, Fig. 5, and of less thickness than the track so as to eliminate unnecessary weight and the ends of said side members are reduced in thickness at 13 substantially to one-half the width of said rail or track portions so that when the reduced portion of one side is placed face to face with a similarly reduced portion of the side member of the next link of the series, their combined thicknesses will be equal to and form a continuation of the track surface 9.

Each side member is furthermore provided at opposite ends with bosses 15 which are perforated at 17 to receive pins 19 forming the pivot pins between successive link sections of the chain.

The pins 19 are herein shown as collared or centrally enlarged to form rollers 21 which rollers are arranged to engage the teeth of the sprocket wheels over which said chain is run and to effect the rotation of said pins by reason of the fact that said rollers 21 are of larger diameter than the portions of said pins engaging the perforations in said bosses thereby uniformly distributing the wear upon the pins as well as upon the bosses of said link members. The ends 23 of the rollers 21 constitute shoulders which seat against the inner ends of the bosses 15 of the male links and prevent longitudinal movements of said pins relatively to the links. It is however to be understood that the invention is not limited to the particular construction and arrangement of the pivot pins and the cooperating bearing members of said links.

The lower edges of the side bars 7 of said links are also laterally enlarged to form feet 25 against which are seated plates 27 of any appropriate form constituting the tread plates for the links.

The tread plates 27 are secured to their respective pairs of side members, herein by screws 29, one of said screws being preferably employed at each end of each tread plate for securing that end to the foot 25 of the adjacent side member. Desirably each of said feet is tapped as shown at 31, Fig. 5, to receive the threaded stem of the screw 29 which passes through a perforation 33 in the tread plate 27 and is screwed firmly into its foot so as to rigidly secure that end of the tread plate firmly against the end surface of the foot.

To prevent the working loose of said screw 29 a check nut 35 is added and if desired a lock washer 37 may be used as an additional precaution against accidental loosening of the screw by reason of the vibration of the chain.

The side members 7 of each link are spaced sufficiently far apart to permit the entrance of the sprocket teeth therebetween, and this spacing is sufficient to permit the rollers 21 of the pivot pins to turn freely between the bosses 15 of the link side members.

Separation of said side members is prevented by the screws 29 and said tread plate 27 which when assembled with said link side members form a very rigid link.

To further assist in spacing said side members I have provided cooperating lugs and recesses on the tread plates 21 and feet 25 as shown in dotted lines at 28 and 30 in Figs. 1 and 5.

Desirably the tread plates of successive links have cooperating overlapping edges 39 and 41 which desirably contact with each other at least in the perpendicular plane passing through the axis of the pivot pins 19 (see Fig. 2) so that during the articulations of pivotally joined link sections said overlapping portions will constantly remain in substantial contact and prevent dirt from working through between said tread plates into the interior of the chain.

Furthermore the tread plates 27 are extended transversely of the chain substantially beyond the outer faces of the side members 7 and these projecting portions of said tread plates are sometimes channeled upon their inner faces as shown at 43 in Fig. 5. It will also be noted that the inner flanges of the side members 7 which form the rails 9 extend laterally outwardly as shown at 45 forming pockets in said outer faces of the side members 7 within which stones, dirt and other foreign matter often picked up by the shoes as the tractor is travelling through soft, miry or loose soils will lodge and cause a considerable interference with the proper articulations of said link sections.

In order to prevent any such accumulation either in the pocket in the sides of said link members or in the channels 43 of the tread plates, means have been provided which herein consist of obliquely arranged deflecting plates 47, preferably formed of sheet metal and shaped to nicely fit between the outer extremity 49 of each end of a tread plate 27 and the outer edge 51 of the rail flange 9 of the adjacent side member.

By reason of the inclination of said deflecting plates 47 it will be apparent that any stones, dirt or the like which happens to cling temporarily to the tractor chain as the same passes upwardly over the sprocket wheels and later is shaken off by vibrations of the tractor, will when striking said plate be thrown or deflected outwardly away from the tread plate and the adjacent parts of the links, thereby tending to keep the chain clean and free from dirt or stones.

Any appropriate means may be provided for securing said deflecting plates in proper relation to their respective links, but herein I have provided a tongue 53 formed by detaching portions of the material of said plate, which tongue is perforated at 55 and bent at the desired angle to seat desirably upon the upper face of the foot 25, over the screw 29, said nut 35 and lock washer 37 being then placed upon said screw and firmly clamped against said tongue.

To enable said deflecting plates to be constructed from relatively thin sheet metal and yet be stiff enough to prevent denting by heavy stones or other articles striking the same during the operation of the chain, positioning means 57 desirably formed of sheet metal are secured to the under sides of said plates and provided with legs 59 which extend outwardly into supporting engagement with the inner surface of the tread plate 27.

It is desirable that the teeth of the sprocket which enters the space between the side members 7 of the links be made but slightly less in thickness than the distance between said side members so as to prevent unnecessary side motion of the chain as it passes around the sprocket, and in Fig. 5 is shown the preferred relation of a tooth 61 with the side members 7 of the chain, said tooth being oppositely tapered at 63 to facilitate the entering thereof between said side members as the links move about the sprockets.

The tread plate 27 is shown in Figs. 1 and 5 as having an aperture 64 through which the tapered end of the sprocket tooth may project.

It is inevitable that more or less dirt will work into the chain between the sprocket teeth and said side members and so cause a rapid wearing away of the engaging surfaces of said teeth and side members, but to increase the life of the chain the wearing surfaces of said side members which contact with the sides of the sprocket teeth extend, as shown at 65, a substantial distance inside of the inner faces 67 of the webs of said side members, and provide bearing surfaces which are also extended a substantial distance below the inner rail treads 9 of said side members as viewed in Fig. 5, herein substantially to the horizontal plane of the axes of the pivot pins. The increasing of the areas of contact between the sprocket teeth and said side members will obviously materially prolong the lives of said side members and definitely restrict this wearing to predetermined areas on said links.

Desirably the inner opposed corners of the side members 7 are chamfered at 69 to facilitate the entrance of the tooth between said side members.

Although I have disclosed in detail one full and complete embodiment of my invention it is to be understood that the invention is not limited thereto.

Claims:

1. A track chain comprising, in combination, a link including a pair of side members pivotally connected with side members of an adjacent link, a tread plate secured to each pair of side members and projecting substantially therebeyond, and a stone deflecting member arranged obliquely between each end of said tread plate and the inner edge of the adjacent side member to exclude therefrom stones and other foreign substances.

2. A track chain comprising, in combination, a link including a pair of side members pivotally connected with side members of an adjacent link, a tread plate secured to each pair of side members and projecting substantially therebeyond, means for securing said tread plate to said side members, and a deflecting plate arranged between each projecting end of said tread plate and the adjacent side member to prevent stones and the like from collecting therein, said deflecting plates being secured in place by the securing means for said tread plate.

3. A track chain comprising, in combination, a link including a pair of side members pivotally connected with side members of an adjacent link, a tread plate secured to each pair of side members and projecting substantially therebeyond, means for securing said tread plate to said side members, a deflecting plate arranged between each projecting end of said tread plate and the adjacent side member, and a tongue formed on each plate arranged to cooperate with the adjacent tread plate securing means to secure said deflecting plate.

4. In a tractor chain, a link comprising a pair of side members each constituting a section of a track, a tread plate secured to and projecting substantially beyond said side members, a deflector plate obliquely arranged between each projecting end of said tread plate and the adjacent side member, and a single means for securing each end of said tread plate and the adjacent side member and its deflector plate together.

5. A track chain comprising, in combination, a link including a pair of side members, a tread plate arranged transversely of said side member with its ends projecting substantially therebeyond, a deflector plate arranged obliquely between each projecting end of said tread plate and the adjacent side member, means to position said deflector plates in said oblique position, and means to secure each end of said tread and its adjacent side members and deflector plate together.

6. In a track chain, a link having a laterally projecting rail portion along one edge, a tread plate secured to the other edge of said link, and a deflecting plate extending obliquely from the projecting margin of said rail portion to the margin of said tread plate to deflect foreign matter from said tread plate and from beneath said rail portion.

7. In a track chain, a side link, a tread plate secured to said link and projecting laterally beyond said side link in combination with the member 47.

In testimony whereof, I have signed my name to this specification.

FREDERICK O. SNOW, Jr.